Jan. 8, 1963    E. D. MOSKOW    3,072,135
FRESSURE REGULATOR WITH POSITIVE SHUTOFF AND RELIEF MEANS
Filed March 10, 1961
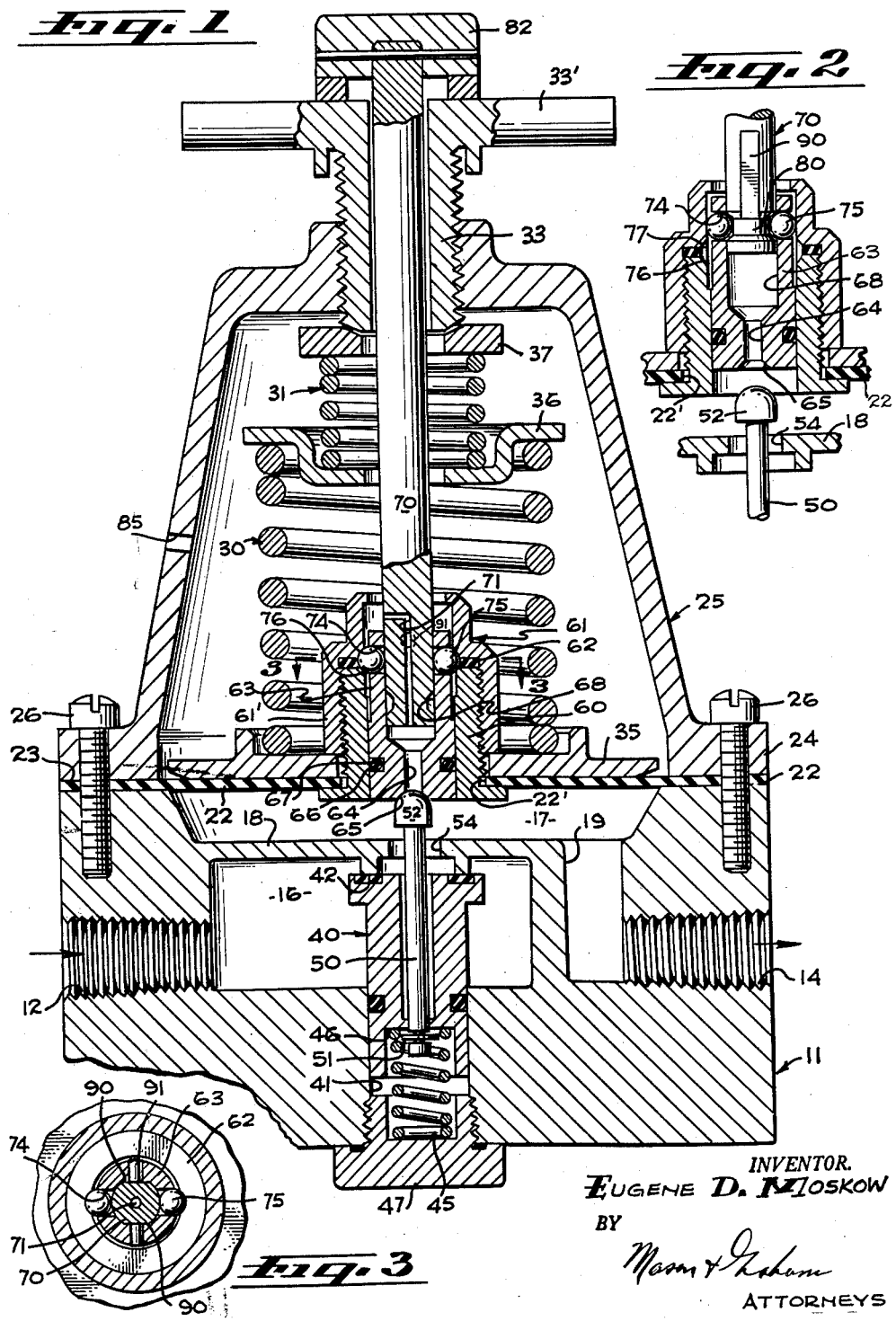
INVENTOR.
EUGENE D. MOSKOW
BY
Mason & Graham
ATTORNEYS United States Patent Office 3,072,135
Patented Jan. 8, 1963

3,072,135
PRESSURE REGULATOR WITH POSITIVE
SHUTOFF AND RELIEF MEANS
Eugene D. Moskow, Los Angeles, Calif., assignor to Benbow Manufacturing Corporation, Culver City, Calif., a corporation of California
Filed Mar. 10, 1961, Ser. No. 94,789
8 Claims. (Cl. 137—116.5)

This invention has to do with pressure regulators or pressure regulator valves for use in controlling pressure fluids.

Conventional pressure regulators with which I am familiar and of the type to which the invention disclosed herein is an improvement employ a spring-biased diaphragm subject to the regulated pressure, or outlet side of the regulator, for opening a valve, which, when open, permits flow of high pressure fluid to the regulated side. Some regulators additionally employ a vent or relief passage through the diaphragm for relieving undue pressure surges or undue buildup of pressure on the outlet side of the regulator. This passage is conventionally controlled by a valve element which also acts as the means for communicating movement of the diaphragm to open the main valve. In devices of this nature, it is necessary to relieve the spring pressure on the diaphragm in order to completely vent the regulated side of the system in which the valve is connected and to render the diaphragm ineffective to open the main valve.

The disadvantage of having to adjust the diaphragm regulating spring to completely vent the regulated side and insure closure of the main valve each time this condition may be desired is obvious.

An object of the invention is to provide a pressure regulator of the general type indicated embodying novel means of rendering a relief valve thereof ineffective to close the relief passage without the necessity of changing the spring adjustment of the valve thereby providing a positive venting of the outlet side of the regulator and insuring that the main valve will remain closed.

Another object is to provide means for rendering a relief valve in a pressure regulator ineffective for operating the main valve in response to movements of the diaphragm, thereby providing means which effectively causes the main valve to remain closed.

A further object is to provide a novel construction of pressure regulator embodying an adjustable relief valve seat which can be positioned so as to cooperate with a relief valve element, or, alternately, manipulated to render it ineffective for cooperation with such valve element.

Still another object is to provide novel means for mounting a relief valve seat in a pressure regulator for adjusted positioning of the seat and to provide novel means for manually controlling the seat from interiorly of the regulator.

These and other objects will be apparent from the drawing and the following description. Referring to the drawing:

FIG. 1 is a central sectional view through a pressure regulator embodying the invention;

FIG. 2 is a fragmentary view of the relief valve structure in the same plane as FIG. 1, but showing the parts in a different position; and FIG. 3 is a cross sectional view on line 3—3 of FIG. 1.

More particularly describing the invention, numeral 11 designates the body of the regulator, and this is shown as provided with an inlet passage 12 and an outlet passage 14. Between the two passages is a valve chamber 16 and a diaphragm chamber 17, the chambers being separated by a partition or baffle 18. A short passage 19 connects chamber 17 with the outlet passage.

The upper wall of chamber 17 is defined by a diaphragm 22 which is mounted between the upper surface 23 of the valve body and the lower flanged end 24 of a bonnet or cap 25 secured to the body by screws 26.

Regulating springs 30 and 31 are housed in the cap between the diaphragm and an axially adjustable sleeve 33 at the upper end of the cap which is threadedly mounted therein. Spring 30 impinges at its lower end against a spring carrier 35 adjacent the diaphragm. An intermediate spring carrier 36 of somewhat dished shape is provided between the two springs and the upper end of the upper spring 31 bears against a washer 37 which in turn is in contact and partially receives the lower or inner end of sleeve 33. The latter is provided with handle portions 33' to facilitate adjustment thereof and consequent regulation of the pressure exerted by the springs upon the diaphragm.

A piston-like main valve 40 is partially received in a bore 41 in the body 11 for limited axial movement toward and away from a valve seat 42 formed on the under surface of the baffle 18. The valve is urged to seated or closed position by a valve spring 45 which is interposed between a recessed face 46 at the lower end of the valve and a plug 47 which is threadedly mounted in the outer or lower end portion of the bore 41.

The valve 40 is provided with a valve stem 50 which is secured at 51 for very limited axial movement. The upper end of the stem has a valve portion 52 which, as will later appear, serves as a portion of a relief valve assembly. The valve stem freely passes through a hole 54 in baffle 18.

The operation of the device thus far described will be apparent as relatively conventional in that when the pressure in chamber 17 is not sufficient to overcome the force of the springs 30 and 31, the diaphragm is urged downwardly, depressing the valve stem 50 thereby opening the valve 40 to permit fluid to flow from the chamber 16 through opening 54 in the baffle to the chamber 17. When the pressure in chamber 17 rises sufficiently the diaphragm is urged upwardly and spring 45 closes the valve.

As previously indicated, it is common to provide valve-controlled relief passages through the diaphragm of pressure regulators, but the disadvantage of these is that the valves are not controllable except by adjustment of the regulator springs which bear against the diaphragm. Therefore, a main feature of the invention is the provision of an adjustable valve seat for the relief valve, as will be described now. The diaphragm is provided with a central opening 22' in which is mounted an externally flanged and externally threaded bushing 60. Mounted on the bushing is a cage 61 which has an enlarged internally threaded portion 61' to receive the bushing. Member 61 abuts the spring carrier 35 and serves to secure the parts of the assembly. A packing ring 62 is provided between the cage and the end of the bushing. Within the bushing is a cylindrical valve seat member 63 having a central passage 64 which terminates in a valve seat 65 for cooperation with the valve element 52. A seal ring 66 is provided in a groove 67 in member 63.

The valve seat member has an enlarged bore 68 beyond passage 64 which slidably receives an actuating rod or plunger 70. This is provided with a vent passage 71 from its lower end to a region above the upper end of the valve seat member 63. The latter has a plurality of radial apertures 74 which house balls 75. When the seat is in its normal position with the stem in inward or lowered position, as shown in FIG. 1, the balls are held in engagement with a groove formed by beveled surfaces 76 and 77 at adjacent edges of members 60 and 61, locking the valve seat member in place. To raise the valve seat member from the position of FIG. 1 to that of FIG. 2, the plunger is pulled out or up allowing the balls 75 to enter a groove 80 in the plunger, thereby releasing the valve seat member from locked position and allowing it to be moved to the position of FIG. 2. A convenient knob or handle portion 82 is provided at the outer end of the stem.

When the parts are in the position shown in FIG. 2 the valve element 52 is spaced from valve seat 65 and the relief or vent passage means 64, 68, 71 is open thereby exhausting fluid from chamber 17 and any equipment and conduits connected to the outlet side of the regulator. The vented fluid may escape from the cap 25 through a special vent hole 85 or space may be provided as shown between the plunger 70 and sleeve 33. The diaphragm then becomes ineffective to open the main valve 40 which thus remains closed, since the valve seat member 63 is retracted so that it does not contact the valve element 52 and thus cannot depress it and valve stem 50.

To return the parts to normal position (FIG. 1) the plunger 70 is pushed in transmitting motion to the valve stem 50 through the valve seat member 63 and valve element 52, thereby opening the main valve 40 and restoring pressure to the outlet side of the regulator. A certain amount of overtravel or play is provided for between the plunger and the valve seat member. Thus when the parts are locked (FIG. 1) the overtravel prevents unlocking until the plunger is pulled. When the valve seat member is unlocked (FIG. 2) there is sufficient overtravel to prevent the diaphragm being held up against the regulator springs when the fluid is exhausted from chamber 17. To prevent the plunger being pulled out of the valve seat member, it is provided with two diametrically opposite flats 90 and the valve seat member is provided with two fixed pins 91, the inner ends of which slidably engage the flats 90. Since the latter terminate at their lower ends in the groove 80, the parts are secured together for relative movement.

Although I have illustrated and described a preferred form of my invention, I contemplate that various changes and modifications can be made therein without departing from the invention, the scope of which is indicated by the following claims.

I claim:

1. In a pressure regulator having valve body means including a cap, said valve body means having an inlet and an outlet and a diaghragm chamber therebetween, a spring-biased diaphragm forming one wall of said chamber, a valve-controlled passage between said inlet and said chamber, means for venting said chamber, comprising means forming a vent passage through said diaphragm including a valve seat member defining a valve seat in said chamber, a vent valve element biased to engage said seat, said diaphragm being movable under the influence of excess pressure in said diaphragm chamber to disengage said seat from said valve element, said valve seat member being mounted to be adjusted relative to said diaphragm to move the same out of engagement with said valve element, and means for so moving said valve seat member to render said valve element ineffective to close said vent passage.

2. In a pressure regulator as set forth in claim 1 in which the vent valve element serves to open the valve of said valve-controlled passage between the inlet and the diaphragm chamber in response to movement of said diaphragm inwardly of said diaphragm chamber.

3. A pressure regulator as set forth in claim 1 in which said valve seat member is tubular and receives an operating rod, and in which locking means is provided between said valve seat member and said diaphragm controlled by said operating rod.

4. In a pressure regulator having valve body means including a cap, said valve body means having an inlet and an outlet and a diaphragm chamber therebetween, a spring-biased diaphragm forming one wall of said chamber, said body defining a fluid passage between said inlet and said diaphragm chamber, a main valve biased to close said passage, means for venting said diaphragm chamber, comprising a tubular valve seat housing means mounted in said diaphragm, a valve seat member mounted in said housing means for limited movement from a first position to a second position outwardly of said diaphragm chamber, said valve seat member having a vent passage therethrough, interengaging means on said valve seat member and housing means for releasably retaining said valve seat in said first position, a valve element engageable with said valve seat of said valve seat member and having a stem connected to said main valve whereby to open said main valve in response to movement of said diaphragm inwardly of said diaphragm chamber, and means for releasing said interengaging means and retracting said valve seat member from engagement with said valve element.

5. The pressure regulator set forth in claim 4 in which the interengaging means comprises balls carried in openings in the wall of said valve seat member and a groove in said housing means, and in which the means for releasing said interengaging means comprises a rod received in said valve seat member for axial movement and having a groove for the reception of said balls.

6. In a valve structure, a valve seat member, a valve element adapted to engage said seat member, means supporting said seat member and element for limited relative movement toward and away from each other, manually operable means releasably locking said valve seat member in a given position, and means for releasing said valve seat member and retracting the same from said given position and out of possible engagement thereof by said valve element.

7. In a housing, a tubular valve structure, a valve seat cage assembly within said housing, a tubular valve seat member received in said assembly, said member having a plurality of openings in its wall and having balls in the openings, said assembly having a groove for partially receiving said balls, and a rod receivable in said valve seat member and extending to the exterior of the housing, said rod being mounted for limited axial movement, said rod having a region of large diameter adapted when positioned opposite said balls to hold said balls outwardly in engagement with said groove and having a region of reduced diameter adapted when positioned opposite said balls to allow said balls to move radially inward of said seat member and release the same from the cage assembly for movement of said valve seat member relative to said cage assembly.

8. The valve structure of claim 7 in which said valve seat member and said rod are provided with interengaging means preventing removal of said rod from said valve seat member.

References Cited in the file of this patent
UNITED STATES PATENTS
2,733,729    Wolfe _____ Feb. 7, 1956
FOREIGN PATENTS
507,972    Great Britain _____ June 23, 1939